(12) United States Patent
Spisak et al.

(10) Patent No.: US 11,598,053 B2
(45) Date of Patent: Mar. 7, 2023

(54) SYSTEM AND METHOD FOR SUPPORTING A RAIL OF A CONCRETE PAVER FROM A SERIES OF BARRIERS HAVING DIFFERING BARRIER WIDTH CHARACTERISTICS

(71) Applicant: Terex USA, LLC, Westport, CT (US)

(72) Inventors: Thomas Walter Spisak, Hartford, SD (US); Kevin James Kruse, Sioux Falls, SD (US)

(73) Assignee: Terex USA, LLC, Westport, CT (US)

( * ) Notice: Subject to any disclaimer, the term of this patent is extended or adjusted under 35 U.S.C. 154(b) by 0 days.

(21) Appl. No.: 16/751,454

(22) Filed: Jan. 24, 2020

(65) Prior Publication Data

US 2020/0240092 A1 Jul. 30, 2020

Related U.S. Application Data

(60) Provisional application No. 62/796,187, filed on Jan. 24, 2019.

(51) Int. Cl.
*F16M 11/00* (2006.01)
*E01C 19/00* (2006.01)
*F16M 13/02* (2006.01)

(52) U.S. Cl.
CPC ......... *E01C 19/004* (2013.01); *F16M 13/022* (2013.01)

(58) Field of Classification Search
CPC ............................. F16M 13/022; E01C 19/004
See application file for complete search history.

(56) References Cited

U.S. PATENT DOCUMENTS

| | | | | |
|---|---|---|---|---|
| 1,279,059 A | * | 9/1918 | Whiteway et al. | ... E01C 19/506 249/8 |
| 2,873,529 A | * | 2/1959 | Hogan | ..... E01C 23/05 404/61 |
| 5,048,781 A | * | 9/1991 | Breen | ..... E04G 17/12 249/219.1 |
| 5,156,753 A | * | 10/1992 | Speidel | ..... B28B 7/02 249/159 |
| 5,244,172 A | * | 9/1993 | Allega | ..... F16M 13/02 248/161 |
| 6,178,716 B1 | * | 1/2001 | Chen | ..... E04C 5/168 404/135 |
| 6,866,445 B2 | * | 3/2005 | Semler | ..... E01C 23/01 404/119 |
| 7,069,680 B1 | * | 7/2006 | Crawford | ..... G09F 7/18 24/502 |

(Continued)

OTHER PUBLICATIONS

Terex Bid-Well Adds Barrier Brackets, Swing Leg and Universal Hydraulic Crown to 4800 Paver—https://www.equipmentworld.com/better-roads/article/14954559/terex-bid-well-adds-barrier-brackets-swing-leg-and-universal-hydraulic-crown-to-4800-paver (Jan. 24, 2014).

*Primary Examiner* — Amy J. Sterling
(74) *Attorney, Agent, or Firm* — Simmons Perrine Moyer Bergman PLC

(57) ABSTRACT

A system for paving a bridge comprising a screed rail configured to support a concrete paver and a plurality of adjustable width barrier brackets to support the screed rail with a bridge barrier, where each adjustable width barrier brackets comprise a rail support bracket and an "L" barrier bracket which allows for width adjustment by translation of the rail support bracket through the "L" barrier bracket.

16 Claims, 3 Drawing Sheets

(56) References Cited

U.S. PATENT DOCUMENTS

| | | | |
|---|---|---|---|
| 7,182,309 B1 * | 2/2007 | Olsen | E01C 19/506 |
| | | | 249/2 |
| 7,908,809 B2 * | 3/2011 | Meier | E04F 21/04 |
| | | | 52/367 |
| 8,079,566 B1 * | 12/2011 | Hurst | E04G 13/00 |
| | | | 249/34 |
| 9,598,827 B1 * | 3/2017 | Pavloff, Jr | E01F 15/088 |
| 10,106,993 B2 * | 10/2018 | Harrison | E01C 19/502 |

* cited by examiner

SYSTEM AND METHOD FOR SUPPORTING A RAIL OF A CONCRETE PAVER FROM A SERIES OF BARRIERS HAVING DIFFERING BARRIER WIDTH CHARACTERISTICS

CROSS REFERENCE TO RELATED APPLICATIONS

The present application claims the benefit of the filing date of provisional patent application having Ser. No. 62/796,187 filed on Jan. 24, 2019, by TEREX USA, LLC, which application is incorporated herein in its entirety by this reference.

FIELD OF THE INVENTION

The present invention generally relates to concrete paving, and more particularly relates to methods and machines for paving finishing, and/or maintaining roads, bridges and other concrete via having barriers which are used to support the screed rail.

BACKGROUND OF THE INVENTION

In the past, the concrete paving industry has utilized various different types of barrier brackets for supporting the screed rail for pavers. These barrier brackets often would be custom made to fit a specific barrier, or oversized barrier brackets were used and after the oversized barrier bracket was placed over the barrier, material would be wedged between the barrier bracket and the barrier to limit the movement of the bracket with respect to the barrier.

The use of custom barrier brackets for each width of barrier is expensive in that many different sizes of barrier brackets would be needed to be purchased and stored for later use. The use of oversized barrier brackets required more time and skill necessary to obtain an adequate fit between the barrier and the barrier bracket.

Consequently, there exists a need for improved methods and apparatuses for efficiently supporting a screed rail from a variety of barriers with differing widths.

SUMMARY OF THE INVENTION

It is an object of the present invention to reduce the number of barrier brackets needed by a building contractor to support screen rails from barriers having differing width characteristics.

It is a feature of the present invention to provide a barrier bracket having an adjustable width characteristic.

It is an advantage of the present invention to allow for adjusting a barrier bracket to fit a barrier prior to placing any part of the barrier bracket over the barrier.

The present invention is carried out in a "bracket to barrier wedging-less" manner, in a sense that occasions needing to wedge material between the barrier and a bracket located over the barrier are eliminated or at least greatly reduced.

Accordingly, the present invention is a method of paving, finishing, and/or maintaining (with a work platform) a concrete bridge, road, comprising the steps of: providing a rail to be supported by a barrier, providing a barrier bracket to be placed over the barrier to support the rail; changing a width characteristic of the barrier bracket to correspond to a width characteristic of the barrier, before the barrier bracket is placed over the barrier; placing the width adjusted barrier bracket over the barrier and supporting the rail by the width adjusted barrier bracket.

Additionally, the present invention is an improved system for use with the new method of paving a concrete bridge where the system comprises: a first bracket portion configured to engage a first side of a barrier and a second bracket portion configured to engage a second side of said barrier which is opposite said first side; said first bracket portion and said second bracket portion configured to permit relative motion therebetween to adjust a width characteristic of the combination of the first bracket portion and the second bracket portion to accommodate barriers having differing width characteristics.

BRIEF DESCRIPTION OF THE DRAWINGS

The invention may be more fully understood by reading the following description of the preferred embodiments of the invention, in conjunction with the appended drawings wherein.

DETAILED DESCRIPTION

Although described with particular reference to barrier brackets for concrete bridge barriers, the systems and methods of the present invention can be implemented in many different types of brackets for supporting paver rails, which are independent of the material used to create the bridge barriers. The present invention is intended to be used for paving bridges and elevations or roadways that contain or have barriers, walls, parapets or other vertical protuberances in proximity of a paving area. The scope of the legal protection is intended to be defined in the claims below. The term paver is used widely in this description but it should be understood that any concrete paving implement could be used in conjunction with the rails discussed herein. The term concrete implement shall hereafter refer to a concrete paver, bridge paver, sidewalk paver, or a work platform or suitable substitutes thereof.

In an embodiment, the system and method of the present invention described herein can be viewed as examples of many potential variations of the present invention which are protected hereunder. The following details are intended to aid in the understanding of the invention whose scope is defined in the claims appended hereto.

Figure 1:
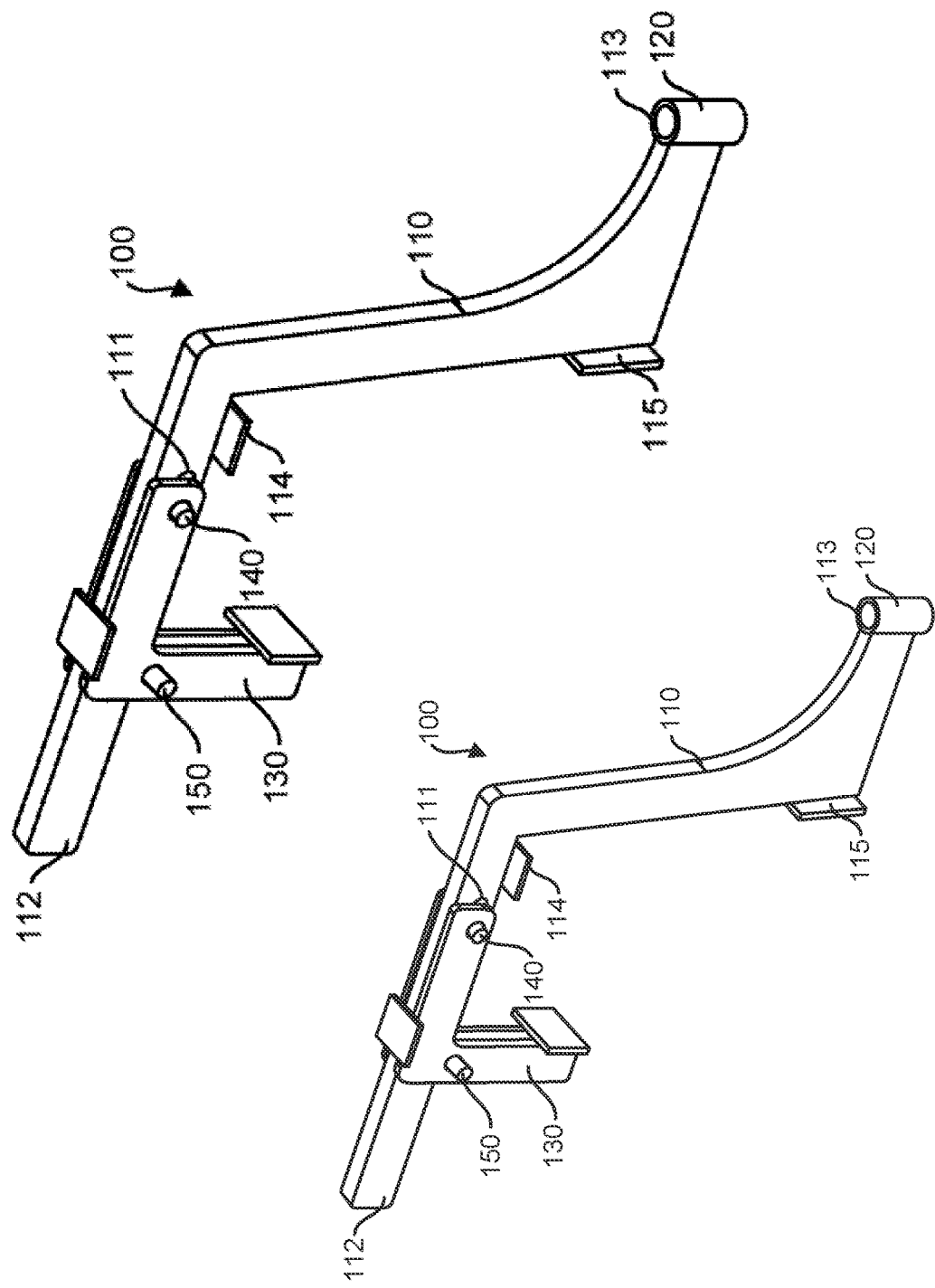
FIG. 1 is a perspective view of the adjustable barrier bracket of the present invention, in a fully assembled configuration.

Now referring to the drawings wherein like numerals refer to like matter throughout, and more particularly in FIG. 1, there is shown a perspective view of the adjustable barrier bracket 100, of the present invention, in a fully assembled state, without the height adjustable rail support system 200 (FIG. 2) being disposed in the barrier bracket tube 120. Barrier bracket tube 120 is shown coupled to a first end 113 of a rail support bracket 110, which is configured to run across a top side of a concrete bridge barrier 302 (FIG. 3) and along a paver side of said concrete bridge barrier 302. Rail support bracket 110 is shown with only a single exposed hole of a width adjustment hole array 111. Adjacent to width adjustment hole array 111 is a top contact pad 114 disposed on an underside of the rail support bracket 110 for contacting a top portion of concrete bridge barrier 302. A bottom contact pad 115 is disposed on the rail support bracket 110 so as to contact a lower paver side of said concrete bridge barrier 302. "L" barrier bracket 130 is shown having been slid past second end 112 of rail support bracket 110. The above described portions of rail support bracket 110 can be made of laser cut steel or other suitable substitute materials manufactured in any suitable manner. The details of any paving job, including the type, size and weight of the concrete paver, will dictate numerous engineering choices when making any specific embodiment of the present invention. Width adjustment dimension setting pin 140 is shown disposed in a penultimate hole of said width adjustment hole array 111. Pivot limiting pin 150 is shown disposed beneath a top side portion of rail support bracket 110.

Figure 2:
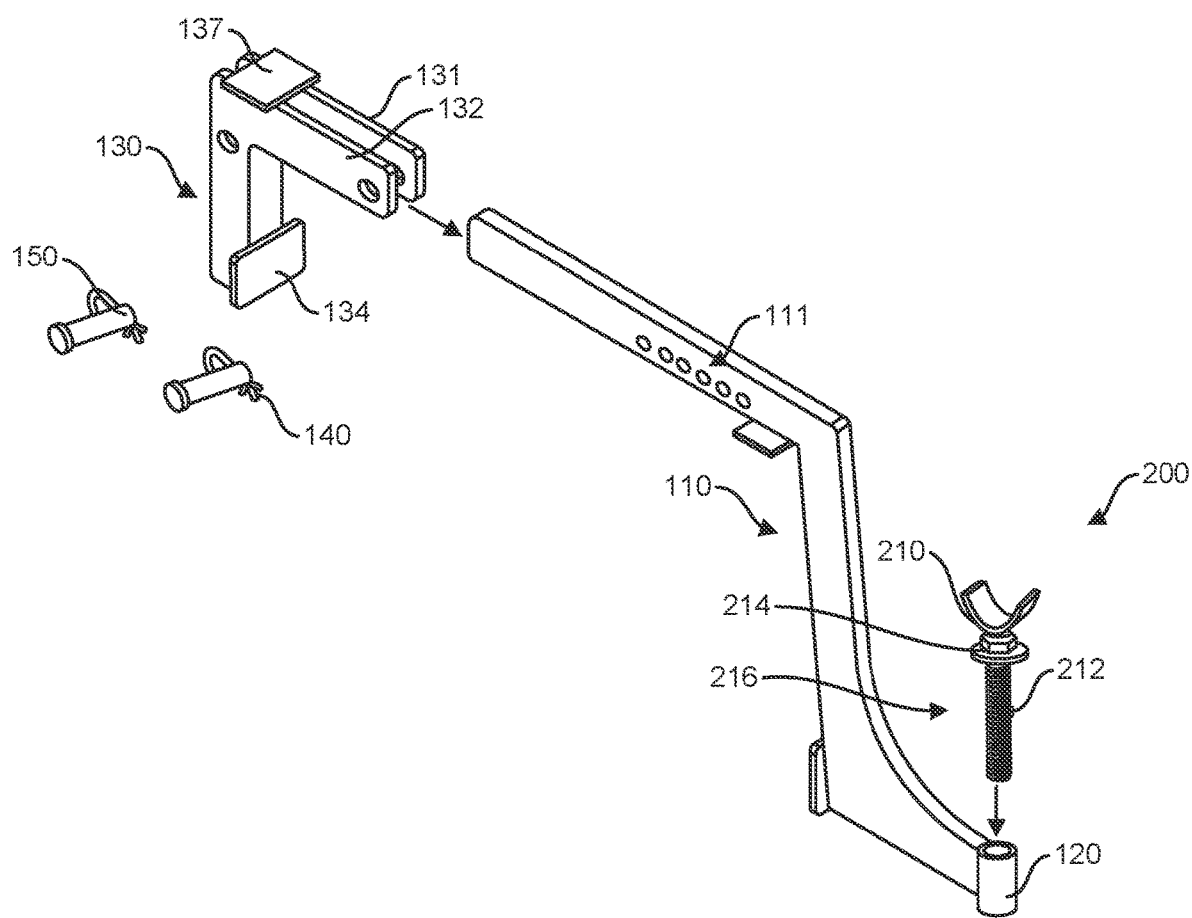
FIG. 2 is an exploded perspective view of the adjustable barrier bracket of FIG. 1 together with a chair with attached threaded rod of the present invention.

Now referring to FIG. 2, there is shown exploded view of the adjustable barrier bracket 100 of FIG. 1 together with the height adjustable rail support system 200, which could be similar or even identical to prior art systems, which could also include a rail receiving chair 210, threaded rod 212, height adjustment nut 214, and washer 216.

The entire width adjustment hole array 111 is shown. "L" barrier bracket 130 is shown as being made of a first L plate 131 and a second L plate 132 being connected by top side connection plate 133 and L bracket contact pad 134.

Figure 3:
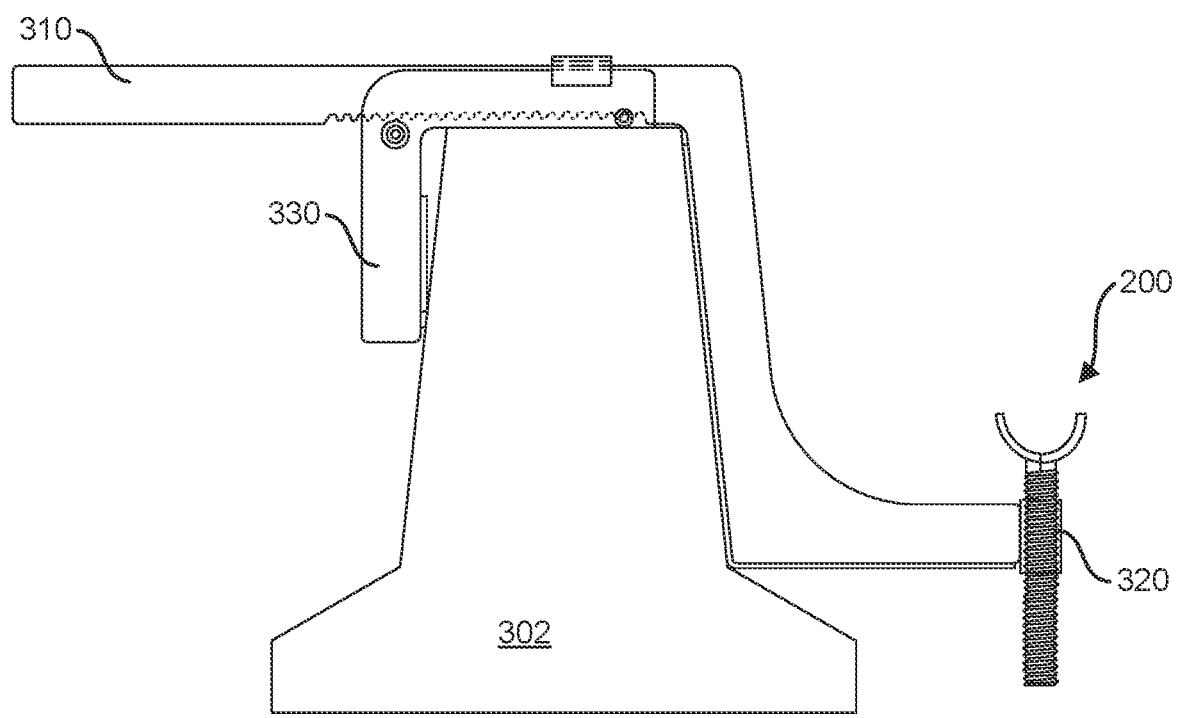
FIG. 3 is a side view of an alternate embodiment of the present invention with a serrated portion for providing finer granularity in width adjustments.

Now referring to FIG. 3, there is shown a side view of an alternate embodiment of the present invention which has been adapted to provide for more precise width adjustments owing to the serrated rail support bracket 310 which has relatively closely spaced protuberances (compared to the spaced apart holes of the width adjustment hole array 111. These protuberances are configured to engage with pins through the "L" barrier bracket 330. The height adjustable rail support system 200 could be the same and serrated barrier bracket tube 320 may be the same as barrier bracket tube 120. Concrete bridge barrier 302 is shown with a flat narrow top, but wider and rounded top bridge barrier could be accommodated by the system of FIGS. 1 and 2, and in some cases without the need for any modifications, other than the adjustment of the width of the adjustable barrier bracket 100.

The system of the present invention and the methods of the present invention could be used and performed without the need for using any tools to make adjustments to the width characteristics of the various adjustable barrier brackets. Moreover, these adjustments could be made in advance of the adjustable barrier bracket being placed on the bridge barrier which will support the rail. Lastly, the present invention could eliminate the need to wedge matter between the bracket and the barrier as a way of reducing relative movement therebetween which is caused by oversized brackets. One method of adjusting the adjustable barrier bracket 100 of the present invention could comprise the following steps:

1) provide a rail support bracket 110, with a width adjustment hole array 111;
2) provide an "L" barrier bracket 130, with a pair of coaxial holes;
3) changing an alignment of said pair of coaxial holes in said "L" barrier bracket 130 from being aligned with a first array hole in said width adjustment hole array 111, by translating the "L" barrier bracket 130 along the rail support bracket 110 so as to be in alignment with a second array hole in said width adjustment hole array 111;
4) placing a pin through first one of said pair of coaxial holes in said "L" barrier bracket 130, pushing the pin through said second array hole and then through a second one of said pair of coaxial holes in said "L" barrier bracket 130;
5) placing said adjustable barrier bracket 100 over a bridge barrier.

The precise implementation of the present invention will vary depending upon the particular application.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred and/or exemplary embodiment thereof.

We claim:

1. A system for supporting a concrete paver, of the type having a motorized truss and a motorized reciprocating carriage, the system comprising:
   a plurality of adjustable barrier brackets, each of which is configured to be placed over a pre-existing barrier and is able to be reconfigured to reduce any free space between any contact portion of any adjustable barrier bracket and a barrier, without any material being wedged between said contact portion and any barrier;
   wherein each of said plurality of adjustable barrier brackets is able to be reconfigured without the use of any tools; and wherein each of said plurality of adjustable barrier brackets comprises a rail support bracket and an "L" barrier bracket; and
   wherein said "L" barrier bracket further comprises a first L plate and a second L plate, and a connection plate; which are configured in combination to permit the rail support bracket to translate through the "L" barrier bracket.

2. The system of claim 1 wherein said rail support bracket is configured with surface features capable of cooperating with other members to temporarily fix a width dimension for said adjustable barrier bracket.

3. A system for supporting a concrete paver by a portion of a bridge comprising:
   a plurality of barrier brackets each being configured to be placed over a barrier and having:
      a first side support bracket;
      a second side clamping bracket;
      a rail support system coupled to a lower portion of said first side support bracket;
      structure configured to cooperate with both said first side support bracket and said second side clamping bracket to permit regulation of a width characteristic of a barrier bracket by controlled relative movement therebetween; and
      a rail disposed between and supported by said plurality of barrier bracket.

4. The system of claim 3 wherein said first side is a paving side and said second side is a non-paving side and wherein said structure is one of a portion of said paving side support bracket, said non-paving side, clamping bracket, or an additional member which engages both said paving side support bracket and said non-paving side clamping bracket.

5. The system of claim 4 wherein said structure comprises a pin and wherein said rail is a screed rail.

6. The system of claim 5 wherein said pin engages a protuberance or a hole in each of said paving side support bracket and said non-paving side clamping bracket.

7. The system of claim 6 wherein said pin engages a hole through each of said paving side support bracket and said non-paving side clamping bracket.

8. The system of claim 7 wherein said non-paving side clamping bracket further comprises a first L plate and a second L plate.

9. The system of claim 8 wherein said pin engages both of said first L plate and said second L plate.

10. The system of claim 9 further comprising plurality of contact pads disposed at positions where contact between the adjustable barrier bracket is configured to engage with a bridge barrier.

11. A system, configured to be placed over a barrier, for supporting a concrete paver by said barrier having a predetermined barrier width characteristic, comprising:
   a) means for supporting a rail, with a width adjustment hole array;
   b) means for providing an "L" barrier connection, with a pair of coaxial holes;
   c) means for changing an alignment of said pair of coaxial holes in said "L" barrier connection from being aligned with said first array hole in said width adjustment hole array, by translating the "L" barrier connection along the means for supporting a rail support so as to be in alignment with a second array hole in said width adjustment hole array; and
   e) means for creating an adjusted barrier bracket by pushing a first pin through a second one of said pair of coaxial holes in said "L" barrier connection, pushing the pin through said second array hole and then through said first one of said pair of coaxial holes in said "L" barrier connection.

12. The system of claim 11 wherein said means for supporting a rail has a barrier bracket tube disposed thereon.

13. The system of claim 12 wherein said barrier bracket tube has a height adjustable rail support system disposed therein and wherein the concrete implement is a paver.

14. The system of claim 11 wherein the system is free of any material wedged between any portion of any of a plurality of adjusted brackets and a barrier.

15. A system for supporting a concrete paver, of the type having a motorized truss and a motorized reciprocating carriage, the system comprising:
   an adjustable barrier bracket, which is configured to be placed over a pre-existing barrier and is able to be reconfigured to reduce any free space between any contact portion of any adjustable barrier bracket and a barrier, without any material being wedged between said contact portion and any barrier; and
   wherein said adjustable barrier bracket is able to be reconfigured without rotating a first threaded member with respect to a second threaded member.

16. The system of claim 15 wherein said adjustable barrier bracket comprises a rail support bracket and an "L" barrier bracket.

* * * * *